Nov. 6, 1928.

C. D. McARTHUR 1,690,124

JOINT FOR FURNITURE AND THE LIKE

Filed March 19, 1928

INVENTOR
Charles D. McArthur
by
James C. Bradley
atty

Patented Nov. 6, 1928.

1,690,124

UNITED STATES PATENT OFFICE.

CHARLES D. McARTHUR, OF BERKELEY, CALIFORNIA.

JOINT FOR FURNITURE AND THE LIKE.

Application filed March 19, 1928. Serial No. 262,874.

Figure 1:
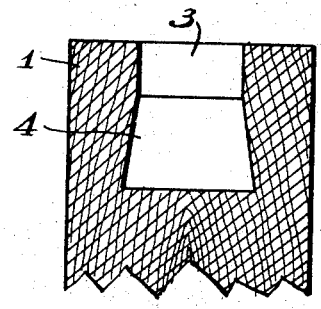
Figure 2:
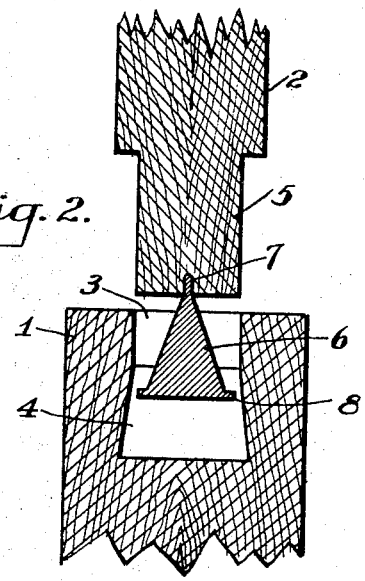
Figure 3:
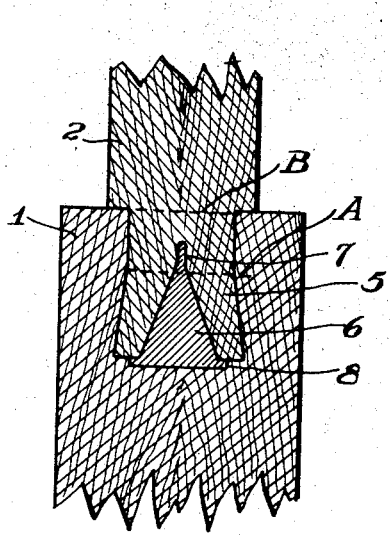
Figure 4:
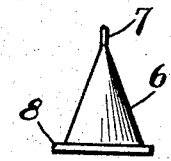

The invention relates to joints for furniture of the socket and tenon type. It has for its principal objects the provision of an improved joint which is little more expensive than the ordinary socket and tenon joint, but which is very much stronger and more enduring. A further object is a joint having a tapering socket in which the danger of the tenon breaking off where it enters the socket is reduced, as compared with joints of this general type as heretofore constructed. One embodiment of the invention is illustrated in the accompanying drawings, wherein:

Figure 1 is a section through the socket member. Fig. 2 is a section through the socket member and tenon, with the wedge in position in the tenon just before it is driven into the socket. Fig. 3 is a section through the completed joint. And Fig. 4 is a detail view of the wedge employed.

Referring to the drawings, 1 is the socket member of the joint and 2 is the tenon member. In the socket member is bored a socket comprising the outer portion 3 having straight walls and the inner portion 4 having tapering walls, the socket being preferably formed by the use of the machine shown and described in my application, Serial Number 182,330.

The tenon member has an end portion 5 having a diameter such that it makes a snug fit in the portion 3 of the socket and a length equal to the depth of the socket. Before inserting the end 5 in the socket, the wedge is driven into such end, as indicated in Fig. 2. This wedge comprises a conical body portion 6, a nail point 7 and a base 8, such base having a diameter equal to or very slightly less than that of the end 5. The end 5 is moved inward until the base 8 of the wedge engages the bottom of the socket, after which the tenon is driven into the position of Fig. 3 by a hammer or other suitable means. The wedge is of such size that it spreads the end 5 of the dowel member so that it completely fills the tapered portion 4 of the socket. A small amount of glue is used in the joint, so that when the joint is completed, a thin film is provided between the opposing surfaces of the socket and dowel members.

This makes a very secure joint, as the expanded end of the dowel member cannot be pulled out of the socket, even after the glue loses its strength. The bending of the wood in the tenon member occurs along the dotted line A (Fig. 3) remote from the face of the socket member, so that the danger of the tenon breaking off along the line B, where a failure in joints of this kind generally occurs, is avoided. The length of the wedge is preferably such that its point 7 lies opposite the inner end of the straight portion 3 of the socket, so that the danger of cracking the tenon outward past the line B is avoided. The relatively large base 8 on the wedge is desirable, as it prevents the base from being driven into the wood of the socket to any substantial extent when the tenons happen to be of very hard wood. The nail point 7 permits the wedge to be easily applied to the end of the tenon by pressure or with a slight blow and does not expand the end 5 so that it cannot be readily inserted through the opening 3. This procedure insures that the wedge shall always be accurately centered with respect to the tenon. The use of the straight portion 3 at the entrance to the tapered portion of the socket insures a snug fit with the end 5 of the tenon such as cannot be secured where the taper extends to the surface of the socket member, as in the latter case it is very difficult to bore a series of holes having their outer ends of the same diameter. As a result, taper holes usually have a loose fit with their tenons at their outer ends, thus decreasing the security of the joint.

What I claim is:

In combination in a joint, a socket member having a socket therein which extends inward with a straight wall for a portion of the depth of the socket and then tapers outwardly for the remaining portion of such depth, a tenon member fitting the socket, and a solid wedge member of metal of general conical shape having its base engaging the bottom of the socket and penetrating the tenon so that it is spread out and fills the tapering portion of the socket, said wedge having a nail point and a base larger in diameter than the base of its conical portion.

In testimony whereof, I have hereunto subscribed my name this 13th day of March, 1928.

CHARLES D. McARTHUR.